Jan. 17, 1939.   H. E. BERNHARD   2,144,253
STEREOSCOPIC PICTURE
Filed April 24, 1936
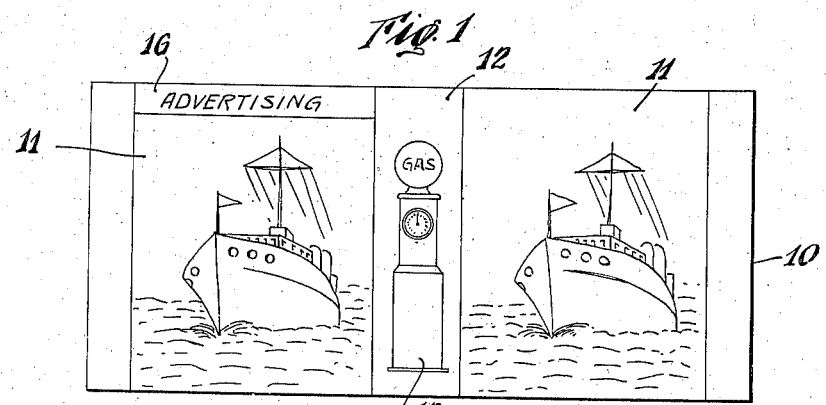
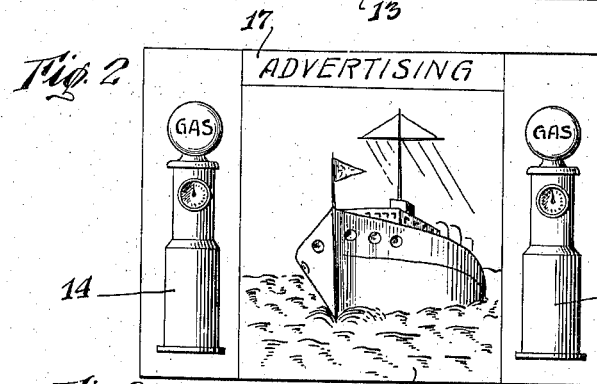
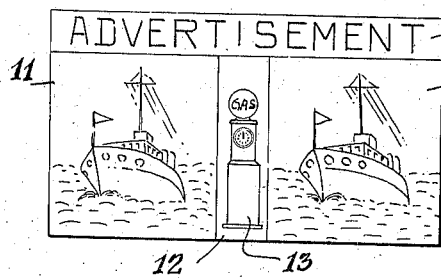
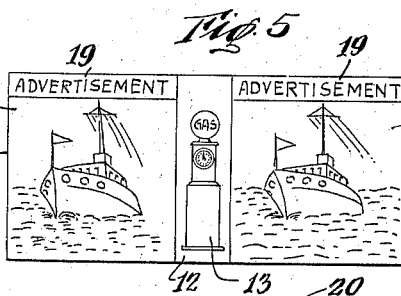
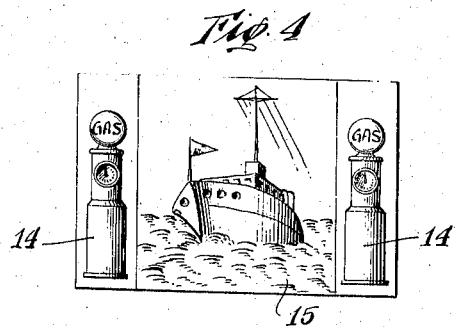
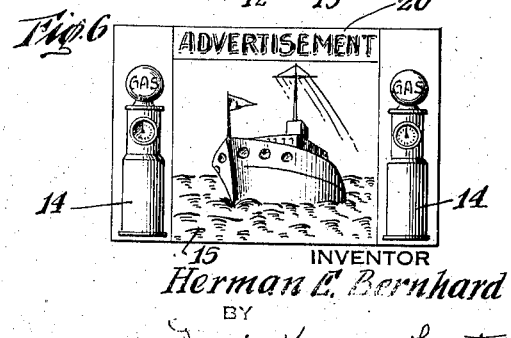
INVENTOR
Herman E. Bernhard
BY
ATTORNEYS Patented Jan. 17, 1939

2,144,253

UNITED STATES PATENT OFFICE 2,144,253

STEREOSCOPIC PICTURE

Herman E. Bernhard, Westfield, N. J.

Application April 24, 1936, Serial No. 76,111

1 Claim. (Cl. 88—29)

This invention relates to an improvement in stereoscopic pictures and the like, and especially those which are adapted for educational or advertising purposes.

It is an object of the invention to provide such pictures which, when viewed through a stereoscope, will, in addition to the showing of the primary illustration in three dimensions, likewise disclose a secondary illustration or descriptive matter within the line of vision, but in a secondary position as, for example, in the nature of a border or similar portion.

It is a further object to provide text or pictures which, when viewed without the aid of a stereoscope, present an unintelligent or scrambled appearance, but which when viewed through a stereoscope present a single intelligible view or picture which may or may not be in three dimensions.

With these and other objects in mind, reference is had to the attached sheet of drawings in which:

Fig. 1 represents a stereoscopic view of a picture embodying one form of the invention;

Fig. 2 is a schematic view of the picture shown in Fig. 1 as it would appear when viewed through a stereoscope;

Fig. 3 is a view of another form of stereoscopic picture embodying another modification of the invention;

Fig. 4 is a schematic representation of the picture shown in Fig. 3 as viewed through a stereoscope;

Fig. 5 is a still further modification of the invention, while

Fig. 6 is a schematic view of the picture shown in Fig. 5 as viewed through a stereoscope.

In the several views a backing member 10 is provided upon which suitable stereoscopic pictures 11 may be mounted. As is well known, these pictures or images are most commonly obtained by resorting to the use of a stereoscopic camera by means of which a subject is photographed in duplicate through spaced lenses, the resulting negative showing two images of the subject in spaced relationship. After mounting, these pictures may be viewed through a stereoscope which optically merges the spaced pictures into a single composite picture having the illusion of the third dimension. This phenomenon is so well known that it is felt that the above cursory description thereof will be sufficient to convey the exact description of the subject matter.

It is of course apparent that in addition to reproducing stereoscopic pictures by means of photography, they can likewise be done through printing or on a drafting board as long as certain basic laws as to the spacing of the two images are adhered to. I have discovered that in the mounting of stereoscopic pictures as, for example, on the backing member 10, if the distance between the centers of the two pictures remains fixed it is possible to trim the border portions of each of the two pictures so that an intervening space, as shown at 12, results. In this space there may be positioned, for example, a pictorial representation or design, as shown at 13, which may take the form of an image or descriptive matter. This central panel and the subject matter portrayed thereon, when viewed through a stereoscope, is optically transformed to border portions 14 at either side of the central panel 15, which latter panel reproduces the images 11 in three dimensions. Likewise, if desired, descriptive matter or advertising may be placed at one edge of one of the images 11 as at 16, and it will be reproduced as at 17 in the corresponding relative position above the image 15, when the picture is placed in a stereoscope. It is also apparent that the border strip 16 might be positioned along any of the four edges of the image 11, or anywhere else on the surface of the image, and would thereupon be reproduced in the same relative position upon the image 15 when viewed through a stereoscope.

In Figs. 3 and 4, in addition to the foregoing, the backing member 10 is provided with a marginal strip 18 which may be positioned along the upper or lower edge of the backing member and which is so proportioned as to be outside the range of vision when the stereoscopic picture is viewed through a stereoscope. The strip 18 may thereafter be provided with any pictorial representation or descriptive matter which is deemed proper and will serve to supplement that portion of the stereoscopic picture which is designed to be seen through the stereoscope. As is shown schematically in Fig. 4, the strip 18 will not be visible when the picture is viewed through the stereoscope.

In Figs. 5 and 6 a border portion of each of the images 11 is provided with descriptive or pictorial matter as shown at 19 and which is formed in the same manner as the images 11 either photographically by means of a stereoscopic camera, or as has been heretofore described by printing or drafting, and which appears when the picture is viewed through a stereoscope in three dimensions as at 20 in Fig. 6. The border strip 19 can, of course, encircle the images 11, or be positioned on any of the edges thereof, or, for that matter, be superimposed upon the images 11 at any suitable place and will appear in three dimensions in the same relative position on the image 15 when the picture is seen through a stereoscope.

From the foregoing it will be noted that many unique and original adaptations of the stereoscopic pictures shown in the drawing can readily be made and that substitutions and changes in the positioning of the relative portions of the pictures may also be effected. Likewise, and particularly with respect to Figs. 5 and 6, fragments or portions of an advertising message and/or other descriptive or pictorial matter may appear in one of the panels 19 and complementary fragments or portions in the other panel 19 so that when viewed through a stereoscope the entire message or pictorial representation appears in proper sequence in the panel 19. Likewise, instead of single images 11, as have been herein illustrated, a plurality of superimposed images might be utilized and which may be so arranged in accordance with well known practice that when viewed through a stereoscope they appear on separate planes.

It is my intention that my invention as hereinbefore described be given the broadest application possible within the physical limits available, and that the foregoing description and the accompanying drawing be taken merely as illustrative and not in a limiting sense.

Having described my invention, what I claim as new and desire to secure by Letters Patent is:

A new stereoscopic slide which includes two equally sized panel portions which have thereupon substantially identical stereoscopic images and which are spaced slightly apart, and a third, narrow elongated panel portion having thereon a dissimilar image, said third panel portion running transverse of the said slide and lying substantially on the transverse center line thereof and being centrally disposed and adjacent said two equally sized panel portions; said stereoscopic images tending to merge into a unitary three-dimensional image when viewed through a stereoscope, and said single dissimilar image tending to be transposed into two two-dimensional images at either side of said three-dimensional image when viewed through said stereoscope.

HERMAN E. BERNHARD.